United States Patent
Kim et al.

(10) Patent No.: US 8,574,785 B2
(45) Date of Patent: Nov. 5, 2013

(54) MEMBRANE-ELECTRODE ASSEMBLY FOR FUEL CELL WITH BINDER LAYER HAVING INORGANIC ADDITIVE AND FUEL CELL SYSTEM USING THE SAME

(75) Inventors: You-Mee Kim, Suwon-si (KR); Min-Kyu Song, Suwon-si (KR); Young-Mi Park, Suwon-si (KR); Sung-Guk An, Suwon-si (KR); Ho-Jin Kweon, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1153 days.

(21) Appl. No.: 11/513,117

(22) Filed: Aug. 31, 2006

(65) Prior Publication Data

US 2013/0252128 A1    Sep. 26, 2013

(30) Foreign Application Priority Data

Aug. 31, 2005    (KR) .................. 10-2005-0080603

(51) Int. Cl.
*H01M 8/10*    (2006.01)
(52) U.S. Cl.
USPC ........................ 429/483; 429/479; 429/492
(58) Field of Classification Search
USPC ............... 429/30, 34, 479, 483, 492
See application file for complete search history.

(56) References Cited

U.S. PATENT DOCUMENTS

| | | | |
|---|---|---|---|
| 2002/0015875 A1* | 2/2002 | Kim | 429/33 |
| 2003/0054219 A1* | 3/2003 | Won et al. | 429/33 |
| 2004/0048129 A1* | 3/2004 | Taft et al. | 429/33 |
| 2005/0271921 A1* | 12/2005 | Kim et al. | 429/33 |
| 2006/0068257 A1* | 3/2006 | Cheng et al. | 429/33 |

FOREIGN PATENT DOCUMENTS

| | | |
|---|---|---|
| JP | 2004-079505 | 3/2004 |
| JP | 2004193136 A * | 7/2004 |
| KR | 10-2002-0096302 | 12/2002 |
| KR | 10-2003-0010406 | 2/2003 |
| KR | 10-2003-0024937 | 3/2003 |
| KR | 10-2004-0051287 | 6/2004 |

* cited by examiner

*Primary Examiner* — Zachary Best
(74) *Attorney, Agent, or Firm* — Robert E. Bushnell, Esq.

(57) ABSTRACT

The present invention relates to a membrane-electrode assembly for a fuel cell and a fuel cell system comprising the same. The membrane-electrode assembly includes an anode and a cathode facing each other and a polymer electrolyte membrane positioned therebetween. The polymer electrolyte membrane adheres to the anode through a binder disposed between the polymer electrolyte membrane and the anode, and adheres to the cathode through a binder disposed between the polymer electrolyte membrane and the cathode. The binder and the polymer electrolyte membrane can include a cation exchange resin and an inorganic additive.

9 Claims, 1 Drawing Sheet

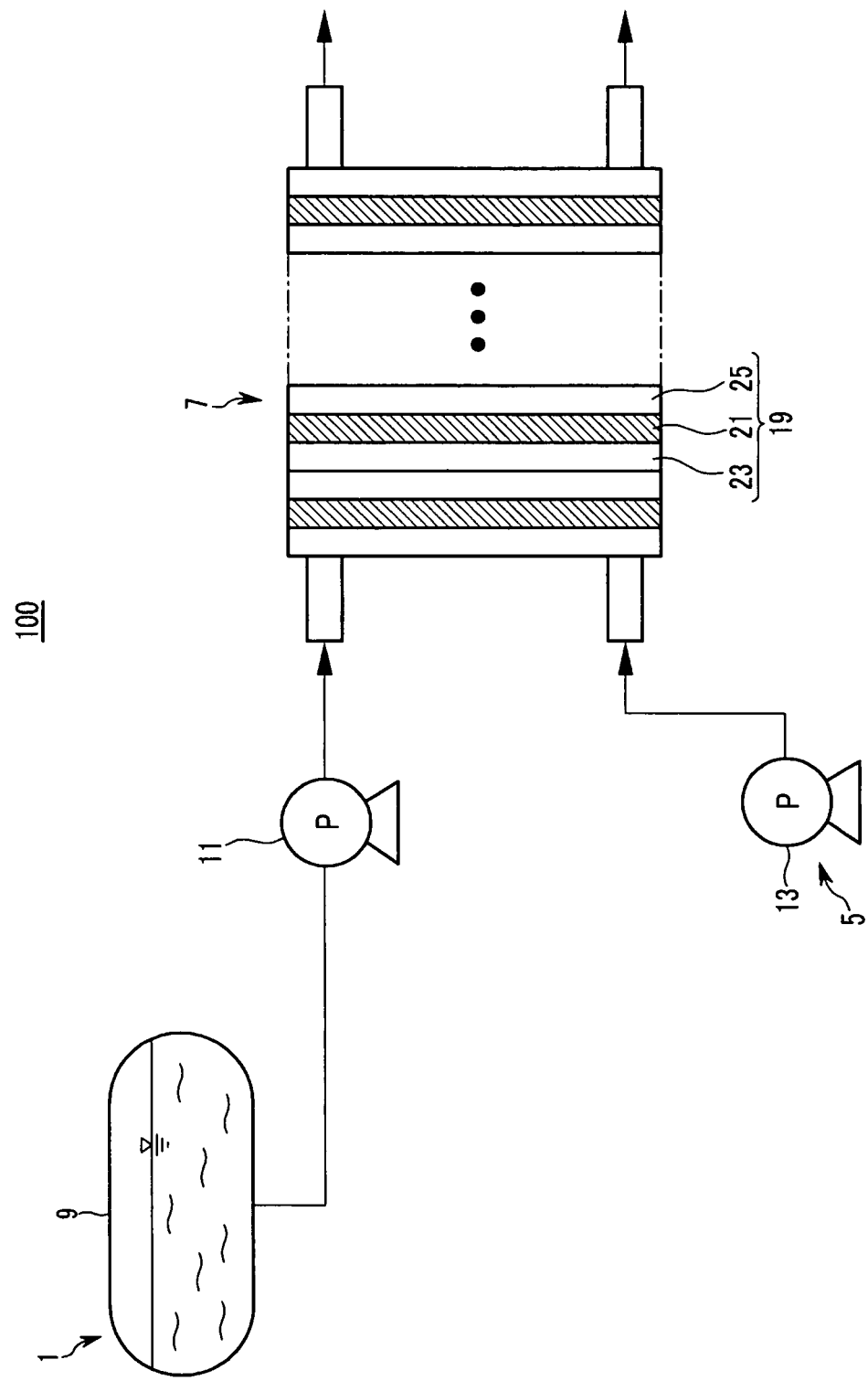

MEMBRANE-ELECTRODE ASSEMBLY FOR FUEL CELL WITH BINDER LAYER HAVING INORGANIC ADDITIVE AND FUEL CELL SYSTEM USING THE SAME

CLAIM OF PRIORITY

This application makes reference to, incorporates the same herein, and claims all benefits accruing under 35 U.S.C. §119 from an application for MEMBRANE-ELECTRODE ASSEMBLY FOR FUEL CELL AND FUEL CELL SYSTEM earlier filed in the Korean Intellectual Property Office on Aug. 31, 2005 and there duly assigned Serial No. 10-2005-0080603.

BACKGROUND OF THE INVENTION

1. Field of the Invention

The present invention relates to a membrane-electrode assembly for a fuel cell and a fuel cell system including the membrane-electrode assembly for a fuel cell. More particularly, the present invention relates to a membrane-electrode assembly for a fuel cell, which is more firmly combined and thereby can reduce cross-over of a fuel, and a fuel cell system including the membrane-electrode assembly for a fuel cell.

2. Related Art

A fuel cell is a power generation system for producing electrical energy through an electrochemical redox reaction of an oxidant with a fuel such as hydrogen or a hydrocarbon-based material such as methanol, ethanol, natural gas, or the like. Such a fuel cell is a clean energy source that can replace fossil fuels. It includes a stack composed of unit cells and produces various ranges of power output. Since it has four to ten times higher energy density than a small lithium battery, it is lightweight and can be used as a small portable power source.

Exemplary fuel cells include a polymer electrolyte membrane fuel cell (PEMFC) and a direct oxidation fuel cell (DOFC). The direct oxidation fuel cell includes a direct methanol fuel cell that uses methanol as a fuel. The polymer electrolyte fuel cell has an advantage of a high energy density and high power, but also has problems that hydrogen gas of the fuel cell needs to be carefully handled and the fuel cell requires accessory facilities such as a fuel reforming processor for reforming methane or methanol, natural gas or the like into hydrogen gas.

On the contrary, a direct oxidation fuel cell has a lower energy density than that of the gas-type fuel cell but has the advantages of easy handling of a liquid-type fuel, a low operation temperature, and no need for additional fuel reforming processors. Therefore, the direct oxidation fuel cell has been acknowledged as an appropriate system for a portable power source for small electrical equipments.

In the above-mentioned fuel cell systems, the stack that substantially generates electricity includes several to scores of unit cells stacked adjacent to one another, and each unit cell is formed of a membrane-electrode assembly (MEA) and a separator (also referred to as a bipolar plate). The membrane-electrode assembly is composed of an anode (also referred to as a fuel electrode or an oxidation electrode) and a cathode (also referred to as an air electrode or a reduction electrode) that are separated by a polymer electrolyte membrane.

A fuel is supplied to an anode and absorbed on catalysts of the anode, and thereafter is oxidized to produce protons and electrons. The electrons are transferred into a cathode via an out-circuit, while the protons are transferred into the cathode through the polymer electrolyte membrane. In addition, an oxidant is supplied to the cathode, and then the oxidant, protons, and electrons are reacted together on catalysts of the cathode to produce electricity along with water.

The above information disclosed in this background section is only for enhancement of understanding of the background of the invention and therefore, it should be understood that the above information may contain information that does not form the prior art that is already known in this country to a person or ordinary skill in the art.

SUMMARY OF THE INVENTION

A purpose of the present invention is to provide a membrane-electrode assembly that includes a polymer electrolyte membrane having uniform electrical properties across the membrane. Another purpose of the present invention is to provide a fuel cell system including the membrane-electrode assembly.

In order to accomplish these purposes, the present invention provides a membrane-electrode assembly for a fuel cell including an anode and a cathode and a polymer electrolyte membrane disposed therebetween. The polymer electrolyte membrane adheres to the anode and cathode through a binder disposed between the polymer electrolyte membrane and the anode and a binder disposed between the polymer electrolyte membrane and the cathode, respectively. The binder includes a cation exchange resin and an inorganic additive.

The present invention also provides a fuel cell system including at least one electricity generating element, which includes the membrane-electrode assembly and a separator and can produce electricity through oxidation process of a fuel and a reduction process of an oxidant, a fuel supplier, which supplies a fuel to the electricity generating element, and an oxidant supplier, which supplies an oxidant to the electricity generating element.

BRIEF DESCRIPTION OF THE DRAWING

A more complete appreciation of the invention, and many of the attendant advantages thereof, will be readily apparent as the same becomes better understood by reference to the following detailed description when considered in conjunction with the accompanying drawings in which like to reference symbols indicate the same or similar components, wherein:

FIG. 1 schematically shows the structure of a fuel cell system constructed as one embodiment of the present invention.

DETAILED DESCRIPTION OF THE INVENTION

An embodiment of the present invention will hereinafter be described in detail with reference to the accompanying drawing.

A membrane-electrode assembly for a fuel cell includes an anode and a cathode and a polymer electrolyte membrane disposed between the anode and the cathode. According to one embodiment of the present invention, a binder is used to attach the polymer electrolyte membrane to the anode, and also to attach the polymer electrolyte membrane to the cathode. In other words, there is a binder layer of the present invention between the anode and the polymer electrolyte membrane, and also between the cathode and the polymer electrolyte membrane.

The binder includes a cation exchange resin and an inorganic additive. According to one embodiment, the polymer electrolyte membrane also can include a cation exchange resin and an inorganic additive. The cation exchange resin and inorganic additive of the binder may preferably include the same cation exchange resin and inorganic additive that are included in the polymer electrolyte membrane. Since the binder can improve adherence between an electrode and a polymer electrolyte membrane, it resultantly contributes to improve a cycle-life of a fuel cell, and particularly can effectively prevent a fuel movement from an anode to a cathode.

In addition, an inorganic additive prevents cross-over of a fuel, particularly in a hydrocarbon fuel, and improves mechanical strength of a polymer electrolyte membrane. Therefore, when a polymer electrolyte membrane additionally includes an inorganic additive, the effect and advantage of the binder of the present invention can be maximized. In other words, since a polymer electrolyte membrane has the same composition as that of a binder, even when the polymer electrolyte membrane includes an inorganic additive, the binder can still have the common composition as that of the polymer electrolyte membrane and can maintain the same degree of miscibility, which improves adherence.

A polymer electrolyte membrane itself can reduce a fuel transmission rate. If a binder is disposed between a polymer electrolyte membrane and an electrode, the binder can further reduce the fuel transmission rate, and therefore the present invention can more effectively prevent cross-over of a fuel.

In the polymer electrolyte membrane and binder of the embodiment of the present invention, a mixing ratio of the cation exchange resin and an inorganic additive is in a range of 98 wt% to 90 wt%:2 wt% to 10 wt%. When the inorganic additive is less than 2 wt%, it has little effect in reducing a fuel transmission rate, while when the inorganic additive is more than 10 wt%, it can be difficult to disperse the inorganic additive into a cation exchange resin, and the inorganic additive could rather inhibit a fuel flow at an electrode.

The cation exchange resins for the polymer electrolyte membrane and binder of the present invention may be any polymer resin binder if it has proton conductivity. The proton-conductive polymer may be a polymer resin having at its side chain a cation exchange group, such as a sulfonic acid group, a carboxylic acid group, a phosphoric acid group, a phosphonic acid group, or derivatives thereof. Examples of the polymer resin may include fluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, polyphenylquinoxaline-based polymers, or a combination thereof. In a preferred embodiment, the polymer electrolyte membrane includes proton conductive polymers such as poly(perfluorosulfonic acid) (NAFION®), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), or poly(2,5-benzimidazole).

The inorganic additives in the polymer electrolyte membrane and binder improve mechanical strength and prevent cross-over of a hydrocarbon fuel such as methanol. Example of the inorganic additive includes silica (fumed silica, Aerosil®, Cab-O-sil®), alumina, mica, zeolite (SAPO-5®, XSM-5®, AIPO-5®, VPI-5®, MCM-41®), barium titanate, a ceramic, inorganic silicate, zirconium hydrogen phosphate, $\alpha\text{-}Zr(O_{a1}PCH_{a2}OH)_a(O_{b1}PC_{b2}H_{b4}SO_{b5}H)_b \cdot nH_2O$ (where a, a2, a, b1, b2, b4, b5, and b are the same or different from one another and all an integer ranging from 0 to 14, but n is an integer ranging from 0 to 50), $\nu\text{-}Zr(PO_{a1})(H_{a2}PO_{a3})_a(HO_{b1}PC_{b2}H_{b3}SO_{b4}H)_b \cdot nH_2O$ (where a1, a2, a3, a, b1, b2, b3, b4, and b are the same or different from one another and all an integer ranging from 0 to 14, but n is an integer ranging from 0 to 50), $Zr(O_{a1}PC_{a2}H_{a3})_aY_b$ (where a1, a2, a3, a, and b are the same or different from one another and all an integer ranging from 0 to 14), $Zr(O_{a1}PCH_{a2}OH)_aY_b \cdot nH_2O$ (where a1, a2, a, and b are the same or different from one another and all an integer ranging from 0 to 14, but n is an integer ranging from 0 to 50), $\alpha\text{-}Zr(O_{a1}PC_{a2}H_{a3}SO_{a4}H)_a \cdot nH_2O$ (where, a1, a2, a3, a4 and a are the same or different from one another and all an integer ranging from 0 to 14, but n is an integer ranging from 0 to 50), $\alpha\text{-}Zr(O_{a1}POH) \cdot H_2O$ (where a1 is an integer ranging from 0 to 14), $(P_2O_5)_a(ZrO_2)_b$ (where a and b are the same or different from one another and all an integer ranging from 0 to 14) glass, $P_2O_5\text{—}ZrO_2\text{—}SiO_2$ glass, or combinations thereof. According to the preferred embodiment, inorganic silicate may be preferred.

The inorganic silicate has a clay structure, that is, a layered structure. Its basic structure includes a combination of a tetrahedral sheet and an alumina octahedral sheet. These two sheets, after a hydroxide-group condensation reaction, are formed into a layered structure. The inorganic silicate can be sorted into pyrophylite-talc, montmorillonite (MMT), fluorohectorite, kaolinte, vermiculite, illite, mica, or brittle mica, depending on its internal negative electric charge. Particularly, montmorillonite is preferred in the present invention.

The montmorillonite has a combined structure of an alumina octahedral sheet and silicate tetrahedral sheet, where $Mg^{2+}$, $Fe^{2+}$, and $Fe^{3+}$ ions are substituted for $Al^{3+}$ ions of an alumina octahedral sheet and $Al^{3+}$ ions are substituted for $Si^{4+}$ ions of a silicate tetrahedral sheet. The montmorillonite overall has a negative electric charge. In addition, it has cations and water molecules between the layers to entirely balance the electric charge.

The inorganic silicate preferably has an aspect ratio of 1/30 to 1/1000, more preferably 1/100 to 1/800, and the most preferably 1/500 to 1/800. When the silicate has an aspect ratio of more than 1/30, the exfoliated silicate does not act as a diffusion barrier between gas and liquid, and thereby its barrier properties remarkably deteriorate. In addition, when the inorganic silicate has an aspect ratio of less than 1/1000, exfoliating the silicate becomes difficult due to permeation of a cation exchange resin chain into a polymer electrolyte membrane, and as a result dispersing the silicate into the cation exchange resin in the prepared polymer electrolyte membrane becomes difficult.

The inorganic silicate has a major axis ranging from 0.05 µm to 0.5 µm long, and preferably from 0.05 µm to 0.2 µm long. When the length is less than 0.05 µm, an inorganic silicate has no plate shape structure, and thereby has less effect for preventing cross-over of a fuel. If the length is more than 0.5 µm, it is not preferable because an inorganic silicate is too big.

When the layered-structure of the inorganic silicate is exfoliated, a preferable distance between the silicate layers is at least 3 nm. When polymer chains are intercalated into a plate-phase inorganic silicate and thereby exfoliate the layers, the exfoliated layers have a distance of at least 3 nm. As the polymer chains are more intercalated, a distance between the inorganic silicate layers increases. However, when the distance between the layers becomes larger as the layers disperse in a disordered manner, the distance cannot be defined due to the disorder and can not be measured. Accordingly, the term "a distance between layers" is no longer appropriate when the distance between the layers becomes larger. In other words, a distance of minimum 3 nm is sufficient to describe the distance between layers, and its maximum value is meaningless.

The inorganic silicate may be treated with an organic modifying agent. Strong Van der Waals attraction makes it difficult to exfoliate the plate-phase silicate, and the plate-phase silicate is hard to disperse in a polymer resin. The treatment with an organic modifying agent of low molecular weight, however, induces permeation of the agent between th plates, which improves the intercalation with the polymer resin, and as a result makes it easy to exfoliate the plate-phase silicate and the plate-phase silicate easily disperse in the polymer resin.

The organic modifying agent may include a C1 to C20 alkylamine, a C1 to C20 alkylene diamine, a C1 to C20 quaternary ammonium salt, aminohexane, or a nitrogen-containing heterocyclic compound. Specific examples of the alkylamine include methylamine hydrochloride, propyl amine, butyl amine, octyl amine, decyl amine, dodecyl amine, hexadecyl amine, octadecyl amine, N-methyl octadecyl amine, or so on. Examples of the alkylene diamine include 1,6-hexamethylene diamine, 1,12-dodecane diamine, or so on. Examples of the quaternary ammonium salt include dimethyl quaternary ammonium, benzyl quaternary ammonium, 2-ethylhexyl quaternary ammonium, bis-2-hydroxyethyl quaternary ammonium, methyl quaternary ammonium, tetramethylammonium chloride, octadecyl trimethyl ammonium bromide, dodecyltrimethyl ammonium bromide, dioctadecyldimethyl ammonium bromide, bis(2-hydroxyethyl) methyl octadecyl ammonium chloride, or so on. Examples of the aminohexane include 6-aminohexane, 12-aminohexane, and so on, and examples of the nitrogen-containing heterocyclic compound include 1-hexadecylpyridium chloride, or so on.

As mentioned above, the inorganic silicate can be used after treatment with an organic modifying agent, but alternatively, organically-modified inorganic silicate can be used instead of the inorganic silicate. The organically-modified inorganic silicate includes Cloisite6A, Cloisite10A, Cloisite15A, Cloisite20A, Cloisite25A, or Cloisite30B which are manufactured by Southern Clay Products. In one embodiment, Cloisite10A is preferred.

The inorganic additive can be used in its original solid state or in a liquid state by dispersing it in another organic solvent. In this specification, the inorganic additive liquid includes any state of an inorganic additive such as suspension or dispersion state, and there is no restriction in terms of the state if the inorganic additive is added in a liquid organic solvent. When the inorganic additive is used in a liquid state, the inorganic additive is added to an organic solvent to prepare an inorganic additive liquid. The organic solvent includes 1-propanol, 2-propanol, or mixtures thereof.

According to the embodiment of the present invention, a membrane-electrode assembly is fabricated by coating a polymer electrolyte membrane or an electrode with a binder composition. The binder composition includes a cation exchange resin, an inorganic additive, and a solvent. The cation exchange resin and the inorganic additive may be mixed in the solvent. Alternatively, the cation exchange resin can be first added to the solvent to prepare a cation exchange resin solution, and then, the inorganic additive is added to the cation exchange resin solution later.

The cation exchange resin and the inorganic additive are mixed in a ratio of 98 wt % to 90 wt %:2 wt % to 10 wt %. When the inorganic additive is included in less than 2 wt %, it is not sufficient to deteriorate a fuel transmission rate, while when the inorganic additive is more than 10 wt %, it becomes hard to disperse in a cation exchange resin and can rather inhibit a fuel flow at an electrode. An amount of the solvent has no particular limit, only if it is used in an appropriate amount for forming a binder composition.

As for the amount of the binder composition, the weight of a mixture of cation exchange resin and an inorganic additive included in this composition should be in a range of 10 wt % to 20 wt % with respect to the weight of a catalyst coated on an electrode. When the weight of the mixture of a cation exchange resin and an inorganic additive is less than 10 wt %, it has little effect on enhancing adherence of a polymer electrolyte membrane to an electrode, while when the weight is more than 20 wt %, the cation exchange resin as well as the inorganic additive can inhibit a fuel flow on the surface of an electrode.

A hydrophobic organic solvent is suitable for the solvent, and a hydrophilic organic solvent such as alcohol is not appropriate for the solvent. Since a cation exchange resin is hydrophilic while an inorganic additive is hydrophobic, it is not preferable to use a hydrophilic organic solvent such as alcohol, which can precipitate inorganic silicate. The hydrophobic organic solvent include dimethylacetate, dimethylacetamide, dimethylformamide, N-methyl-2-pyrrolidinone, or at least one mixture thereof.

When commercially-available poly(perfluorosulfonic acid) is used as a cation exchange resin, it is generally dissolved in a mixed solvent of water and 2-propanol. Accordingly, the solvent should be evaporated, and after the evaporation, the cation exchange resin needs to be dissolved into a hydrophobic solvent in a concentration of 0.5 wt % to 30 wt % to prepare a cation exchange resin solution.

According to the embodiment of the present invention, a membrane-electrode assembly for a fuel cell includes an anode and a cathode and a polymer electrolyte membrane positioned between the anode and the cathode. In addition, the membrane-electrode assembly includes a binder layer made of a binder composition disclosed in the present invention between the anode and the polymer electrolyte membrane, and also between the cathode and the polymer electrolyte membrane.

The cathode and the anode include a catalyst layer and an electrode substrate. The catalyst layer includes platinum, ruthenium, osmium, a platinum-ruthenium alloy, a platinum-osmium alloy, a platinum-palladium alloy, or a platinum-M alloy (M is at least one transition element such as Ga, Ti, V, Cr, Mn, Fe, Co, Ni, Cu, Zn, Sn, Mo, W, Rh, or combinations thereof). The metal catalyst can be used by itself as a black type, or can be used as being supported in a carbon carrier. Suitable carriers include carbon such as graphite, denka black, ketjen black, acetylene black, activated carbon, carbon nanotube, carbon nanofiber, or carbon nanowire, or inorganic material particulates such as alumina, silica, zirconia, or titania. In a preferred embodiment, carbon can be used.

The electrode substrate plays a role of supporting an electrode and also a role of spreading a fuel and an oxidant to the catalyst layers to help the fuel and oxidant to easily approach the catalyst layers. For the electrode substrate, a conductive substrate is used, for example carbon paper, carbon cloth, carbon felt, or metal cloth (a porous film including metal cloth fiber or a metalized polymer fiber), but it is not limited thereto.

The electrode substrate may be treated with a fluorine-based resin to make the electrode substrate water-repellent, which can prevent deterioration of reactant diffusion efficiency due to water generated during a fuel cell operation. The fluorine-based resin includes polyvinylidene fluoride, polytetrafluoroethylene, fluorinated ethylene propylene, polychlorotrifluoroethylene, fluoroethylene polymers, or so on.

A micro-porous layer (MPL) can be added on the electrode substrate to increase reactant diffusion effects. In general, the microporous layer may include, but is not limited to, a small-sized conductive powder such as a carbon powder, carbon black, acetylene black, activated carbon, carbon fiber, fullerene, nano-carbon, or a combination thereof. The nano-carbon may include a material such as carbon nanotubes, carbon nanofibers, carbon nanowires, carbon nanohorns, carbon nanorings, or combinations thereof. The microporous layer is formed by coating the conductive substrate with a composition including a conductive powder, a binder resin, or a solvent. The binder resin may include, but is not limited to, polytetrafluoroethylene, polyvinylidene fluoride, polyvinylalcohol, celluloseacetate, or combinations thereof. The solvent may include, but is not limited to, water, dimethylacetamide, dimethylsulfoxide, N-methylpyrrolidone, or alcohol such as ethanol, isopropyl alcohol, ethyl alcohol, n-propyl alcohol, or butyl alcohol. The coating method may include, but is not limited to, screen printing, spray coating, doctor blade method, gravure coating, dip coating, silk screening, or painting methods, depending on the viscosity of the composition.

The polymer electrolyte membrane includes a cation exchange resin and additionally, an inorganic additive. The cation exchange resin and the inorganic additive are the same as being included in a binder composition.

A fuel cell system including the membrane-electrode assembly of the present invention includes at least one electricity generating element, a fuel supplier, and an oxidant supplier. The electricity generating element includes a membrane-electrode assembly and separators disposed at each side of the membrane-electrode assembly. The membrane-electrode assembly includes a polymer electrolyte membrane, a cathode disposed at one side of the polymer electrolyte membrane, and an anode disposed at the other side of the polymer electrolyte membrane. The electricity generating element generates electricity through an oxidation process of a fuel and a reduction process of an oxidant.

The fuel supplier plays a role of supplying the electricity generating element with a fuel including hydrogen, and the oxidant supplier plays a role of supplying the electricity generating element with an oxidant. The fuel includes liquid hydrogen or hydrogen gas, or a hydrocarbon-based fuel such as methanol, ethanol, propanol, butanol, or natural gas.

FIG. 1 shows a schematic structure of a fuel cell system that will be described in detail with reference to this accompanying drawing. FIG. 1 illustrates a fuel cell system in which a fuel and an oxidant are separately provided to an electricity generating element through pumps, but the present invention is not limited to this structure. The fuel cell system of the present invention may include an alternative structure in which a fuel and an oxidant are provided in a diffusion manner.

Fuel cell system 100 includes stack 7 that includes at least one electricity generating element 19 that generates electrical energy through an electrochemical reaction of a fuel and an oxidant, fuel supplier 1 for supplying a fuel to electricity generating element 19, and oxidant supplier 5 for supplying an oxidant to electricity generating element 19. In addition, fuel supplier 1 is equipped with tank 9, which stores a fuel, and pump 11, which is connected to thank 9. Fuel pump 11 supplies a fuel stored in tank 9 to electricity generating element 19 with a predetermined pumping power. Oxidant supplier 5, which supplies an oxidant to electricity generating element 19 of stack 7, is equipped with at least one pump 13 for supplying the oxidant with a predetermined pumping power. Electricity generating element 19 includes a membrane-electrode assembly 21 that oxidizes hydrogen or a fuel and reduces an oxidant, separators 23 and 25 that are respectively positioned at each opposite sides of membrane-electrode assembly 21 and supply hydrogen or a fuel and an oxidant.

The following examples illustrate the present invention in more detail. However, it is understood that the present invention is not limited by these examples.

Example 1

A commercially available perfluorosulfonate resin solution (5 wt % NAFION®/$H_2O$/2-propanol, Solution Technology Inc., EW=1,100), in which NAFION® is dissolved in water and 2-propanol, was evaporated at a room temperature, and the resultant product was added to dimethyl acetamide up to 5 wt % in a concentration. The mixture was agitated at 100° C. for 24 hours until a cation exchange resin therein was dissolved, preparing a cation exchange resin solution.

The cation exchange resin solution was added with montmorillonite (Southern Clay Product, Cloisite10A), which was treated with an organic modifying agent (an aspect ratio of 1/500 and a major axis length of about 0.3 μm, based on when an organic modifying agent are fully intercalated) in rates of 95 wt % of the cation exchange resin and 5 wt % of an inorganic additive. The resulting mixture was agitated at 100° C. for 24 hours with a magnet agitator, and thereafter was applied with ultrasound, so that cation exchange resin chains can be permeated between the montmorillonite layers, gaining a resin composition in which silicate is exfoliated. Herein, a distance between the exfoliated montmorillonite layers is more than 3 nm.

The resin composition was used to fabricate a polymer electrolyte membrane in a commonly used method.

Then, a slurry was prepared by mixing 5 wt % of a NAFION®/$H_2O$/2-propanol solution, dipropylene glycol, and deionized water with a Pt—Ru black particle (hereinafter, black refers to a catalyst not supported on a carrier, Johnson Matthey, Hi Spec 6000) and a Pt black particle (Johnson Matthey, HiSpec 1000), and thereafter was coated on a TEFLON (tetrafluoroethylne) film in a screen printing method to respectively form an anode catalyst layer and a cathode catalyst layer.

Next, the polymer electrolyte membrane was interposed between the anode catalyst layer and the cathode catalyst layer. The polymer electrolyte membrane adheres to the anode catalyst layer and the cathode catalyst layer by the use of the resin composition as a binder composition. ELAT electrode substrates manufactured by E-Tek Co. were positioned on the catalyst layers to fabricate a membrane-electrode assembly. In this process, the amount of binder composition was adjusted in a manner that the total amount of the cation exchange resin and the inorganic additive comprising the binder composition was up to 10 wt % of the catalyst weight that was used for forming the electrode catalyst layers.

The ratio of cation exchange resin to the inorganic additive, which were included in the binder layer of the prepared membrane-electrode assembly, was 95 wt %:5 wt %.

Therefore, the present invention provides a membrane-electrode assembly whose members are more firmly attached together than a conventional one, and that can reduce a fuel transmission rate by using a binder including a cation exchange resin and an inorganic additive. Accordingly, the present invention can improve performance of a fuel cell.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A membrane-electrode assembly for a fuel cell comprising:
    an anode comprising a catalyst layer;
    a cathode facing the anode comprising a catalyst layer;
    a polymer electrolyte membrane positioned between the anode and the cathode;
    a first binder layer disposed between the polymer electrolyte membrane and the anode, the polymer electrolyte membrane adhering to the anode through the first binder layer; and
    a second binder layer disposed between the polymer electrolyte membrane and the cathode, the polymer electrolyte membrane adhering to the cathode through the second binder layer; and wherein
    the polymer electrolyte membrane, the first binder layer and the second binder layer comprise a cation exchange resin and an inorganic silicate, and the mixing ratio of the cation exchange resin and the inorganic silicate is in a range of 98 wt % to 90 wt %:2 wt % to 10 wt %; and
    the inorganic silicate comprising one selected from the group consisting of pyrophylite-talc, montmorillonite (MMT), fluorohectorite, kaolinite, vermiculite, illite, and combinations thereof;
    the weight of the mixture of the cation exchange resin and the inorganic silicate of the first binder is in a range of 10 wt % to 20 wt % with respect to the weight of the catalyst in the anode; and
    the weight of the mixture of the cation exchange resin and the inorganic silicate of the second binder is in a range of 10 wt % to 20 wt % with respect to the weight of the catalyst in the cathode.

2. The membrane-electrode assembly for a fuel cell of claim 1, the cation exchange resin including a polymer resin having at its side chain a cation exchange group selected from the group consisting of a sulfonic acid group, a carboxylic acid group, a phosphoric acid group, a phosphonic acid group, and a derivative thereof.

3. The membrane-electrode assembly for a fuel cell of claim 2, the polymer resin including one selected from the group consisting of a fluoro-based polymer, a benzimidazole-based polymer, a polyimide-based polymer, a polyetherimide-based polymer, a polyphenylenesulfide-based polymer, a polysulfone-based polymer, a polyethersulfone-based polymer, a polyetherketone-based polymer, a polyether-etherketone-based polymer, a polyphenylquinoxaline-based polymer, and a combination thereof.

4. The membrane-electrode assembly for a fuel cell of claim 1, comprised of the inorganic silicate having an aspect ratio between about 1/30 and about 1/1000.

5. The membrane-electrode assembly for a fuel cell of claim 1, comprised of the inorganic silicate having a major axis whose length is between about 0.05 micro-meters and about 0.5 micro-meters.

6. The membrane-electrode assembly for a fuel cell of claim 1, wherein the inorganic silicate becomes exfoliated and has a layered structure, and a distance between layers is at least 3 nano-meters.

7. The membrane-electrode assembly for a fuel cell of claim 1, comprised of the inorganic silicate being treated with an organic modifying agent.

8. The membrane-electrode assembly for a fuel cell of claim 7, comprised of the organic modifying agent including one selected from the group consisting of an alkylamine with a carbon number of 1 to 20, alkylene diamine with a carbon number of 1 to 20, quaternary ammonium with a carbon number of 1 to 20, an alkyl ammoniuma salt with a carbon number of 1 to 20, aminohexane, a nitrogen-containing hetero cyclic compound, and a combination thereof.

9. A fuel cell system comprising:
    an electricity generating element comprising:
    a membrane-electrode assembly comprising:
        an anode comprising a catalyst layer;
        a cathode facing each other comprising a catalyst layer;
        a polymer electrolyte membrane positioned between the anode and the cathode;
        a first binder layer disposed between the polymer electrolyte membrane and the anode, the polymer electrolyte membrane adhering to the anode through the first binder layer; and
        a second binder layer disposed between the polymer electrolyte membrane and the cathode, the polymer electrolyte membrane adhering to the cathode through the second binder layer; and wherein
        the polymer electrolyte membrane, the first binder layer and the second binder layer comprise a cation exchange resin and an inorganic silicate; and the mixing ratio of the cation exchange resin and the inorganic silicate is in a range of 98 wt % to 90 wt %:2 wt % to 10 wt %; and
        the weight of the mixture of the cation exchange resin and the inorganic silicate of the first binder is in a range of 10 wt % to 20 wt % with respect to the weight of the catalyst in the anode; and
        the weight of the mixture of the cation exchange resin and the inorganic silicate of the second binder is in a range of 10 wt % to 20 wt % with respect to the weight of the catalyst in the cathode;
    a separator, the electricity generating element generating electricity through oxidation of a fuel and reduction of an oxidant;
    a fuel supplier connected to the electricity generating element for supplying a fuel to the electricity generating element; and
    an oxidant supplier connected to the electricity generating element for supplying an oxidant to the electricity generating element; and
    the inorganic silicate comprising one selected from the group consisting of pyrophylite-talc, montmorillonite (MMT), fluorohectorite, kaolinite, vermiculite, illite, and combinations thereof.

* * * * *